United States Patent [19]

Klie et al.

[11] Patent Number: 4,476,487
[45] Date of Patent: Oct. 9, 1984

[54] METHOD AND CIRCUIT ARRANGEMENT FOR PARTIAL ELECTRONIC RETOUCH IN COLOR IMAGE REPRODUCTION

[75] Inventors: Jürgen Klie, Toekendorf; Klaus Wellendorf, Kitzeberg, both of Fed. Rep. of Germany

[73] Assignee: Dr. -Ing. Rudolf Hell GmbH, Fed. Rep. of Germany

[21] Appl. No.: 380,663

[22] PCT Filed: Sep. 10, 1980

[86] PCT No.: PCT/DE80/00134
§ 371 Date: May 4, 1982
§ 102(e) Date: May 4, 1982

[87] PCT Pub. No.: WO82/00903
PCT Pub. Date: Mar. 18, 1982

[51] Int. Cl.³ .......................... G03F 3/08; H04N 1/46
[52] U.S. Cl. .......................................... 358/80; 358/78
[58] Field of Search .................... 358/80, 75, 78, 76

[56] References Cited

U.S. PATENT DOCUMENTS

| | | | |
|---|---|---|---|
| 3,848,856 | 11/1974 | Reeber et al. | 358/76 |
| 3,972,066 | 7/1976 | Seki et al. | 358/76 |
| 4,060,829 | 11/1977 | Sakamoto | 358/80 |
| 4,204,223 | 5/1980 | Gast et al. | 358/80 |
| 4,236,174 | 11/1980 | Gall | 358/22 |

FOREIGN PATENT DOCUMENTS 1400806 7/1975 United Kingdom .

Primary Examiner—Michael A. Masinick
Assistant Examiner—Luan K. Nguyen
Attorney, Agent, or Firm—Hill, Van Santen, Steadman & Simpson

[57] ABSTRACT

The invention relates to a method for partial electronic retouch in color image reproduction. The color values of the individual color components gained by means of image point-wise, trichromatic color image scanning and digitization are deposited in a storage medium (1). The image point coordinates of the color values to be retouched in a correction area (brush surface) displaceable across the color image and the plurality of correction steps per image point are simultaneously determined with the coordinate pen (51) of a coordinate identification device (50; 51; 52) which is employed by the retoucher like a retouch brush. Image point-wise allocated correction values are calculated for the marked correction area. The color values of the color image or of a color separation are read out of the storage medium (1) and are changed by the correction values under visual control on a monitor (2) in accord with the desired retouch effect. The individual amounts by which the correction values of the correction area are changed per correction step are freely selectable.

By means of prescribing change amounts which decrease from the center of the correction area towards its edge (for example, Gauss distribution), a progressive degree of retouch, i.e., a gradually increasing or decreasing degree of retouch, is achieved within the correction area.

14 Claims, 15 Drawing Figures

METHOD AND CIRCUIT ARRANGEMENT FOR PARTIAL ELECTRONIC RETOUCH IN COLOR IMAGE REPRODUCTION

TECHNICAL FIELD

The invention relates to electronic reproduction technology, particularly to the production of corrected and retouched color separations by means of an electronic image processing system (retouch station).

UNDERLYING PRIOR ART

In electronic color reproduction, three primary measured color value signals which represent the color components red, green and blue of the scanned image points are gained in a color scanner by means of opto-electronic scanning of a master. A color correction computer corrects the measured color value signals and generates the color separation signals therefrom which are required for the production of the color separations, said color separation signals being a measure for the amounts of printing ink required in the later print.

The color separation signals are digitized and are deposited in a storage medium image point-wise as digital color values. The stored color values of various individual masters can be combined according to a layout plan in an image processing system to form the data set of an overall page and/or, on the other hand, subsequent, partial retouches (corrections of color value and/or tint value) can be carried out by means of changing the color values. Partial retouches, i.e., retouches limited to selectable, topically limited image areas, are necessary in order to optimize the correction carried out in the color computer or, on the other hand, in order to take subsequent editorial changes and clients' desires into consideration. These retouches, for example, are a matter of creating highlights by means of lightening, of working out shadow passages by means of darkening, or a matter of improving the delineation by means of brightening and darkening, whereby a gradual (bleeding) effect, i.e., a gradually increasing or decreasing effect, is often to be achieved.

In order to record the retouch color separations, the changed color values are read out of the storage medium, are converted back into analog color separation signals and are supplied to a color scanner in which the rastered or unrastered color separations "yellow", "cyan", "magenta" and "black" for the production of printing forms are exposed.

A method for partial electronic retouch has already been proposed in the German patent application No. P 29 20 058.6 (international patent application No. PCT/DE 80/00070) in which the digital color values are altered partially and image point-wise under visual control on a monitor in accord with the desired retouch effect in the color image or in the color separation, being altered by means of image point-dependent correction values. The image point coordinates of the color values to be retouched and the desired degree of retouch are determined by the retoucher, in that he conducts the coordinate pen of a coordinate identification device over the image part to be retouched like a retouch brush, whereby the coordinate pen contacts the corresponding image points and the degree of retouch for the individual image points is derived from the plurality of contactings. In order to be able to more quickly retouch larger image parts, the correction area and, thus, the plurality of image points covered and retouched with each contact of the coordinate pen is increased, this corresponding to an enlargement of the "brush surface".

This procedure with the coordinate pen as a "electronic retouch brush" specified in the German patent application No. P 29 20 058.6 indeed allows any type of progressions to be achieved but requires a great deal of care and is particularly time-consuming when the progressions are meant to be smooth without perceptible gradation.

DISCLOSURE OF THE INVENTION

It is therefore the object of the present invention to specify a method and a circuit arrangement for partial electronic retouch in color image reproduction which improves the proposed method in such manner that gradual retouch changes and color progressions can be executed more simply and in a shorter time.

Given the present invention, this object is achieved in that the individual amounts by which the correction values ($Y_R$, $M_R$, $C_R$, $K_R$) of the correction area are changed per correction step are freely selectable.

In an advantageous manner, identical change amounts are prescribed for all correction values ($Y_R$, $M_R$, $C_R$, $K_R$) of the correction area, whereby a uniform degree of retouch is achieved within the correction area.

Preferably, decreasing amounts of change are prescribed for the correction values ($Y_R$, $M_R$, $C_R$, $K_R$) from the center of the correction area to its edge, whereby a gradual (progressive) degree of retouch is achieved within the correction area. The amounts of change can be prescribed according to a selectable function, particularly according to a Gauss function.

The correction values ($Y_R$, $M_R$, $C_R$, $K_R$) are added (positive retouch) to the color values (Y, M, C, K) allocated image pointwise or are subtracted (negative retouch) therefrom.

It is proposed in an advantageous embodiment that (a) color increments ($\Delta Y$, $\Delta M$, $\Delta C$, $\Delta K$) are prescribed for the individual color components, being the smallest amounts of change for the correction values ($Y_R$, $M_R$, $C_R$, $K_R$);

(b) the image point coordinate pairs (x,y) of the correction area are determined;

(c) a retouch factor (r) determining the degree of retouch is determined per correction step for each identified image point coordinate pair (x,y), said retouch factor (r) specifying the correction value ($Y_R$, $M_R$, $C_R$, $K_R$) as a plurality of color increments to be added; and (d) retouch factors (r) and color increments ($\Delta Y, \Delta M, \Delta C, \Delta K$) belonging to one another image point-wise are multiplied in order to obtain the respective correction values ($Y_R$, $M_R$, $C_R$, $K_R$).

It is provided that (a) at least one image point coordinate pair ($x_0, y_0$) of the correction area is identified by means of marking with a marking means of a coordinate identification device (50, 51, 52), particularly by means of a coordinate pen (51); and (b) the remaining image point coordinate pairs (x,y) of the correction area are calculated as a function of the marked image point coordinate pair ($x_0, y_0$)

The shape and size of the correction area are fixed by means of selecting the image point coordinate pairs (x,y) to be calculated around the marked image point coordinate pair ($x_0, y_0$).

An advantageous further development provides that
(a) each point contact with the marking means (51) of the coordinate identification device (50, 51, 52) corresponds to a correction step; and (b) each retouch factor (r) for an image point coordinate pair of the correction area is calculated from the plurality of point contacts (n) and a weighting factor (w) prescribed for the appertaining image point coordinate pair, said weighting factor (w) specifying the amount of change of the appertaining correction value ($Y_R$, $M_R$, $C_R$, $K_R$) per point contact as a multiple of the color increments ($\Delta Y, \Delta M, \Delta C, \Delta K$), whereby the coordinate pen (51) is conducted like a retouch brush over the image part to be retouched in order to shift the correction area (brush surface).

It is proposed to prescribe identical weighting factors (w) for all correction values of the correction area, whereby a uniform degree of retouch is achieved within the correction area. Alternatively thereto, it is proposed to prescribe weighting factors (w) decreasing for the correction values from the center of the correction area toward its edge, whereby a gradual (progressive) retouch is achieved within the correction area. In a preferred manner, the digital color values (Y, M, C, K) are read out of the storage medium (1), are altered by the correction values ($Y_R$, $M_R$, $C_R$, $K_R$), and the corrected color values (Y', M', C', K') are redeposited on the storage medium (1) after the conclusion of the retouch.

An advantageous improvement is that the unretouched or retouched color image (original) or, respectively, an unretouched or retouched color separation is displayed on a monitor (2) for visual control, that a displaceable light spot (31) is faded into a picture screen (3), and that the movement of the light spot (31) is synchronized with the movement of the coordinate pen (51) of the coordinate identification device (50, 51, 52).

It is provided that the digital color values (Y, M, C, K) of the individual color separations are loaded from the storage medium (1) into an image repetition memory (7), and that the image repetition memory (7) is cyclically read out for the punctiform recording on the monitor (2).

In a preferred manner, the identified retouch factors (r) are overwritten image point-wise into a retouch memory (49) and, for the purpose of image point-wise allocation of color values (Y, M, C, K) and correction values ($Y_R$, $M_R$, $C_R$, $K_R$), the retouch memory (49) is read out synchronously with the image repetition memory (7).

The retouch factors altered by means of the correction process are respectively overwritten into the retouch memory (49) in a blanking interval of the image recording.

An advantageous further development consists therein that the image point coordinate pairs (x,y) of the marked points are deposited list-wise in the sequence of their detection, and that the image point coordinate pairs (x,y) are called in in the reverse sequence and the corresponding retouch factors (r) in the retouch memory (49) are altered in order to reverse the retouch carried out during the previous contactings of the points contour-true.

In another preferred further development, the entire correction is reversed by means of cancelling the retouch memory (49).

In an advantageous manner, the brush surface is displayed by means of a correspondingly enlarged light spot (31).

The image part to be retouched is advantageously limited by means of an electronically generated mask.

An advantageous arrangement for implementing the method consists of a color generator (38) for forming the color increments ($\Delta Y, \Delta M, \Delta C, \Delta K$), of a retouch generator (39*) for forming the retouch factors (r) for the color values (Y, M, C, K) to be corrected, of a correction value generator (40) connected to the color generator (38) and to the retouch generator (39*) for forming the correction values ($Y_R$, $M_R$, $C_R$, $K_R$), and of logic stages (15, 16, 17, 18) following the image repetition memory (7) in the color channels for changing the color values by means of the correction values.

The retouch generator (39*) is preferably constructed of a coordinate identification device (50, 51, 52) for identifying the image point coordinates (x,y) of the color values to be corrected, of an evaluation circuit (48*) connected to the coordinate identification device (50, 51, 52) for forming the retouch factors (r) for each identified coordinate pair, and of a retouch memory (49) connected to the evaluation circuit (48*).

BRIEF DESCRIPTION OF THE DRAWINGS

In the following, the invention is described in greater detail on the basis of FIGS. 1 through 9. There are shown.

BEST MANNER OF EXECUTING THE INVENTION

Figure 1:
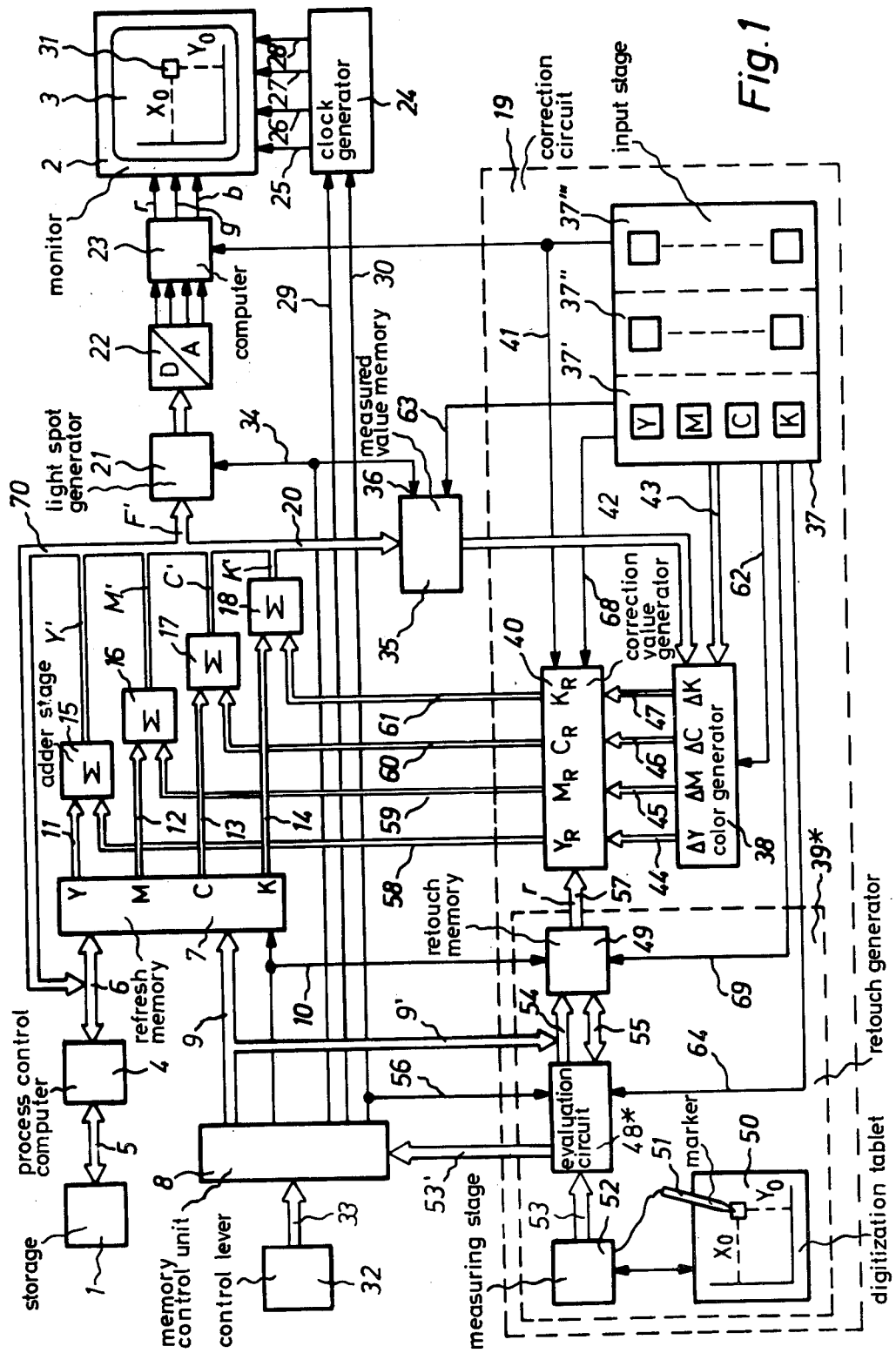
FIG. 1 a circuit arrangement for partial electronic retouch in color image reproduction.
Figure 2:
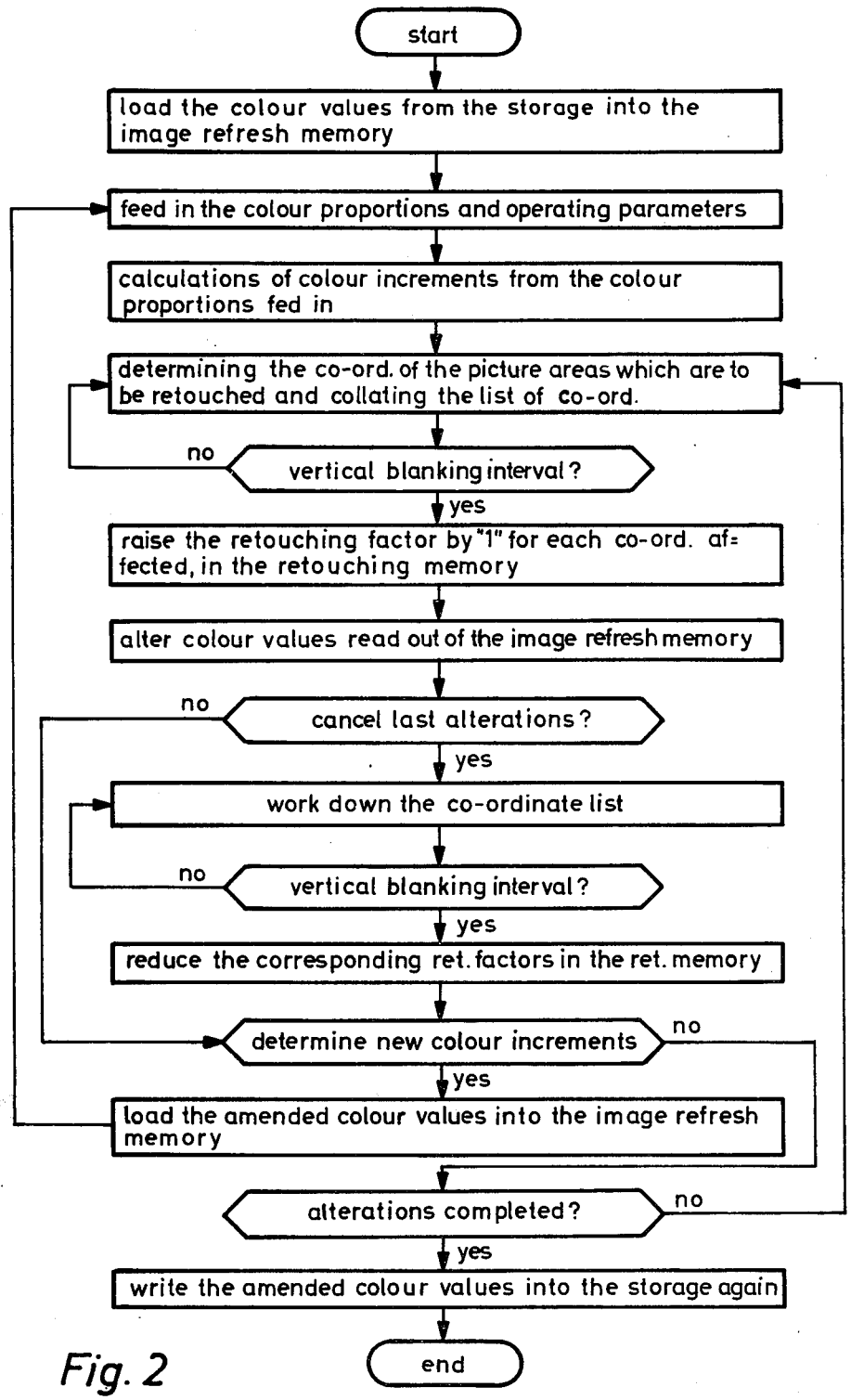
FIG. 2 a flow chart.

FIG. 1 shows the fundamental structure of a circuit arrangement for partial electronic retouch (retouch station) in color image reproduction and FIG. 2 shows a flow chart for explaining the process sequence. Except for the retouch generator, the circuit arrangement essentially coincides with the arrangement illustrated in FIG. 1 of the said German patent application No. P 29 20 058.6 (international patent application No. PCT/DE 80/00070). For this reason, a detailed description of identical components which are referenced with the same reference numerals can be omitted.

A storage medium 1 (magnetic tape; magnetic disk) contains the color values for the color separations "yellow" (Y), "magenta" (M), "cyan" (C) and "black" (K) of a color image to be reproduced which have already been corrected in a color scanner. The color image is to be subjected under visual control on the picture screen 3 of a color monitor 2 to a partial retouch with gradual (progressive) effect, i.e., gradually increasing or decreasing strength.

The color values required for displaying the color image or a corresponding image section are selected or calculated by means of a process control computer 4 from the overall data set of the storage medium 1 and are transferred over data buses 5 and 6 into an image repetition memory 7.

In order to produce a still picture on the color monitor 2, a memory control unit 8 cyclically calls in the X/Y addresses of the image repetition memory 7 over an address bus 9. The stored color values F[Y,M,C,K] are read out and are supplied to digital adder stages 15, 16, 17 and 18 over data lines 11, 12, 13 and 14. In accord with the desired retouch effect, digital correction values $F_R[Y_R, M_R, C_R, K_R]$ are added (positive retouch) in the adder stages 15, 16, 17 and 18 or subtracted therefrom (negative retouch) in order to obtain the retouched color values F'[Y', M', C', K']. The retouch color values F' proceed over a data bus 20 and a light spot generator 21 to a digital-to-analog converter 22 which generates the four analog color separation signals.

A following print simulation computer 23 converts the four color separation signals into the drive signals r, g and b for the color monitor 2 in such manner that the displayed color image conveys the same polychrome impression as the later process print itself. A clock generator 24 synchronized by the memory control unit 8 controls the color image recording.

The correction values $F_R$ are gained in a correction circuit 19 which consists of an input stage 37 with a series of function keys 37', 37" and 37"', of a color generator 38, of a retouch generator 39' modified in comparison to the said German patent application, and of a correction value generator 40.

The locus-dependent correction value $F_R(x,y)$ for each image point with the coordinates x and y is given by the general equation:

$$F_R(x,y) = \Delta F \cdot r(x,y) \qquad (1)$$

or is given for the individual color separations by the equations:

$$Y_R(x,y) = \Delta Y \cdot r(x,y)$$

$$M_R(x,y) = \Delta M \cdot r(x,y)$$

$$C_R(x,y) = \Delta C \cdot r(x,y)$$

$$K_R(x,y) = \Delta K \cdot r(x,y) \qquad (2)$$

In the equations (1) and (2), $\Delta F[\Delta Y, \Delta M, \Delta C, \Delta K]$ are locusindependent color increments which respectively represent the smallest amounts of change for the color values. The color increments are calculated in the color generator 38 from the color values of an initial color and of a target color for the retouch.

A measure for the degree of retouch is the retouch factor r which specifies the plurality of color increments F to be added for each image point in order to obtain the appertaining correction value $F_R$. By means of increasing the plurality of color increments, an intensification of the retouch is achieved and, by means of reducing the plurality, a corresponding decrease of the retouch is achieved. The retouch factors r are gained in the retouch generator 39*.

Figure 8:
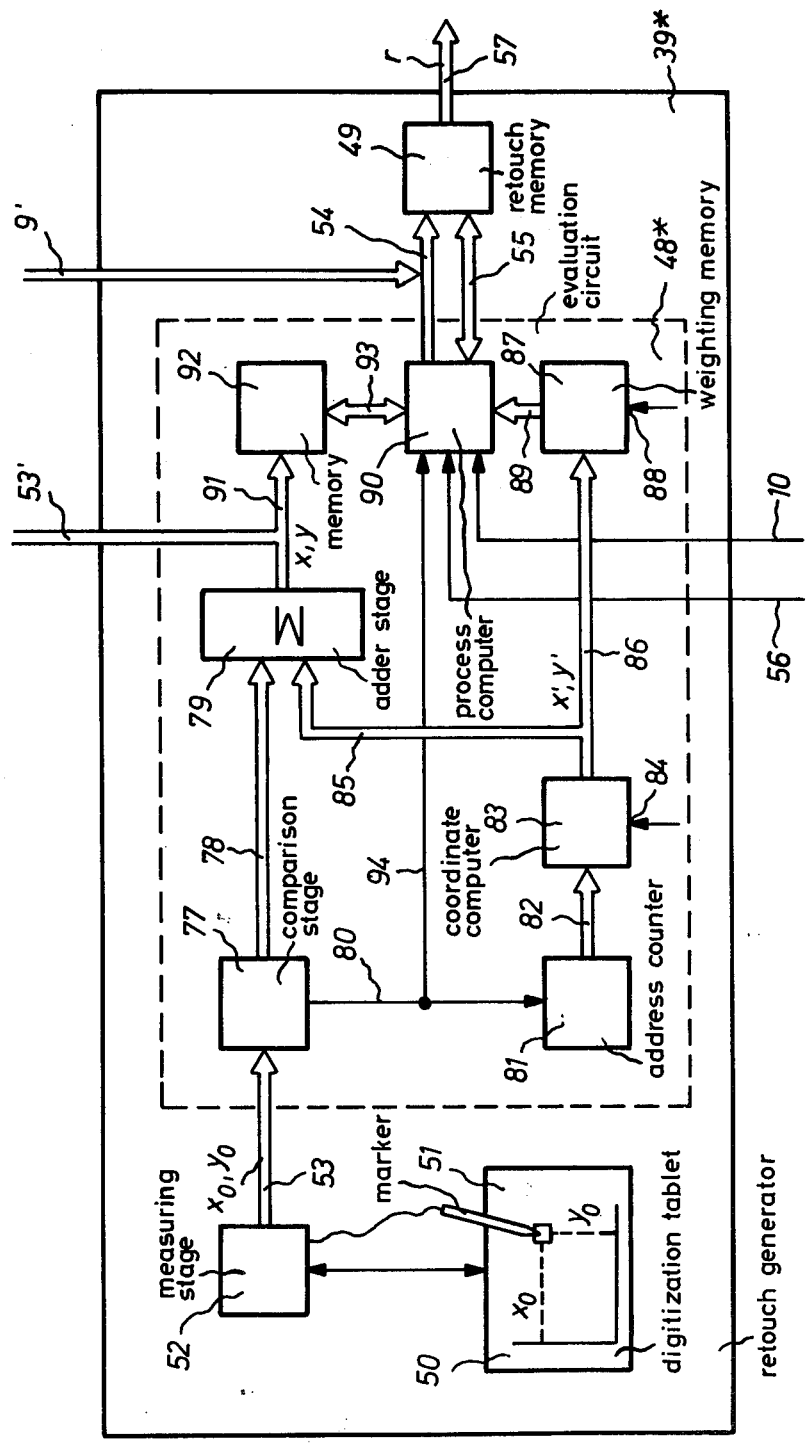
FIG. 8 a sample embodiment of a retouch generator.

The retouch generator 39*, whose structure and manner of functioning are described in greater detail in FIG. 8, essentially consists of a coordinate identification device with digitization tablet 50, coordinate pen 51 and measuring stage 52, of a modified evaluation circuit 48* for calculating the retouch factors, and of a retouch memory 49.

The correction area is both shifted over the image part to be retouched and the respective plurality of correction steps as a plurality of image point contactings is determined by means of the coordinate pen 51. Whereas the coordinate pen 51 itself respectively marks only one image point, the retouch factors of a plurality of selectable image points are simultaneously determined in the environment of the marked image point in the evaluation circuit 48* of the retouch generator 39*. These image points form the correction area. The simultaneous determination of the retouch factors of the correction area corresponds to an enlargement of the effective area of the coordinate pen 51 or of the brush surface, whereby larger surfaces can be more quickly retouched.

The freely selectable plurality and position of the simultaneously addressed image points relative to the marked image point determine the size and shape of the correction area or, respectively, of the brush surface which is moved over the image part to be retouched with the coordinate pen 51.

Figures 3A, 3B, 3C:
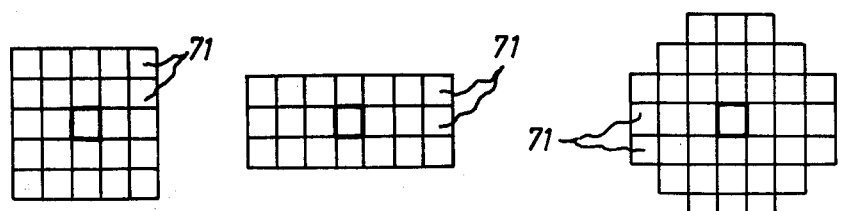
FIGS. 3a –3c show various shapes of brush surfaces.

Some shapes of brush surfaces are illustrated in FIG. 3 for the purpose of explanation. FIG. 3a shows a square brush surface with 5×5 image points 71; FIG. 3b shows a rectangular brush surface consisting of 3×7 image points 71; and FIG. 3c shows a brush surface approximated to the shape of a circle. The image points contacted with the coordinate pen 51—the respective center points of the brush surface in the sample embodiment—are emphasized in the Figures by means of thicker lines.

Figure 4:
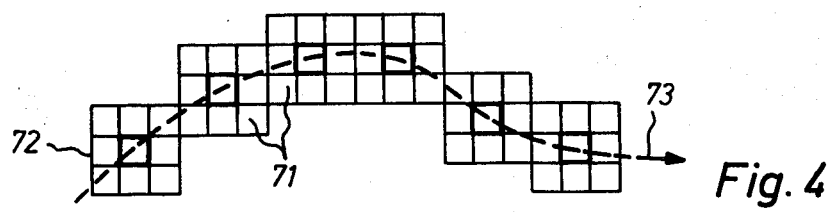
FIG. 4 a track of movement of the brush surface.

FIG. 4 shows the displacement of a square brush surface 72 which consists of 3×3 image points over an image part to be retouched. The path of motion of the coordinate pen 51 is indicated by means of a broken line 73.

Back to FIG. 1.

Inventively, the amounts by which the correction values $F_R$ can be altered within the brush surface per correction step are freely selectable. The corresponding retouch factors r are calculated according to equation (3) in the evaluation circuit 48*.

$$r(x,y) = n(x,y) \cdot w(x,y) \qquad (3)$$

In the equation (3), "n" denotes the desired plurality of correction steps or, respectively, of point contactings with the coordinate pen 51 and "w" denotes a freely selectable weighting factor which specifies the amount of change per correction step for each image point as a multiple of the color increments $\Delta F$.

In case of a uniform degree of retouch within the brush surface as is desired, for example, for a body retouch, the retouch factors of all image points lying within the brush surface are respectively changed by the same amount. The weighting factors w are constant, for example, "1". Upon each contact by the coordinate pen 51, the retouch factors r are then increased by "1" (intensification of the retouch) or are reduced by "1" (retraction of the retouch).

In the case of a progressive degree of retouch, the retouch factors r of the image points lying within the brush surface are altered by different amounts in accord with the selected weighting factors w, whereby the degree of retouch within the brush surface is gradual or progressing, i.e., gradually rising and/or falling, in an advantageous manner.

For example, the weighting factors w can be selected in such manner that a degree of retouch decreasing from the center of the brush surface to its edge is achieved. The degree of retouch can change within the brush surface according to a Gauss curve or according to some other function. The possibilities are not limited to the specified examples. Random weighting factors can be distributed within the brush surface.

The formation of the retouch factors is explained on the basis of graphic illustrations in FIGS. 5 and 6, whereby the retouch factors determined after a specific plurality of correction steps (contactings) have been entered into the brush surface.

Figure 5A:
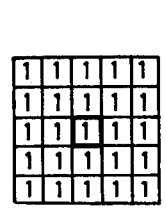
FIGS. 5a –5c are graphic illustrations.
Figure 5B:
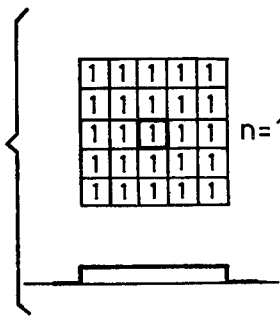
Figure 5C:
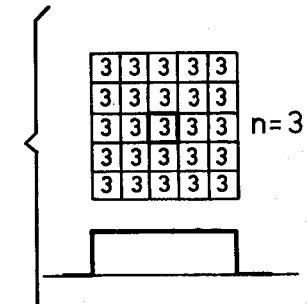

FIG. 5 shows the conditions for a brush surface with uniform degree of retouch. The weighting pattern is illustrated in FIG. 5a. All image points of the brush surface are weighted with w=1. After a contact (n=1) in accord with FIG. 5b, all retouch factors are "1" and the correction values according to equation (1) are $F_R = \Delta F$. After, for example, three correction steps (n=3), as shown in FIG. 5c, all retouch factors have been increased to "3" and the correction values are $F_R = 3\Delta F$.

Figure 6A:
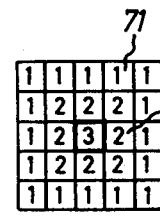
FIGS. 6a –6c are further graphic illustrations.
Figure 6B:
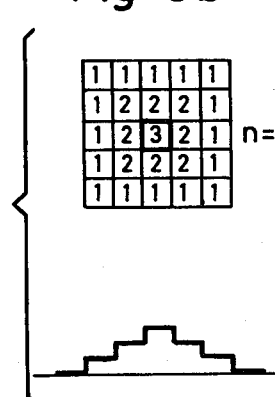
Figure 6C:
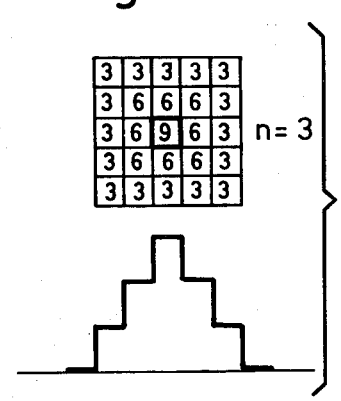

FIG. 6 shows the conditions for a brush surface with a progressive degree of retouch. An evaluation pattern is illustrated in FIG. 6a, with which a decreasing degree of retouch is now achieved as a function of the distance from the center point of the brush surface. The retouch factors after one correction step (n=1) are illustrated in FIG. 6b and those after three correction steps (n=3) are illustrated in FIG. 6c. By means of weighting the image points 71 with w=1 weighting the image points 71' with w=2, the correction value $F_R = 3\Delta F$ derives, for example, after three correction steps for the image point 71 and twice the correction value, namely, $F_R = 6\Delta F$ already derives for the image point 71'. The retouch factors outside of the brush surface are zero. The profiles of the degree of retouch for the individual cases are also schematically illustrated at the same time by means of the center point of the brush surface.

Back to FIG. 1.

The retouch factors determined in the evaluation circuit 48* of the retouch generator 39* are overwritten into the retouch memory 49 over a data bus 55 during the blanking interval of the image recording on the color monitor 2. The corresponding addresses of the retouch memory 49 are selected over an address bus 54.

The blanking interval of the image recording is signaled to the evaluation circuit 48* by the memory control unit 8 over a line 56. The addresses of the image repetition memory 7 and of the retouch memory 49 are cyclically and synchronously called in over address buses 9 and 9', whereby digital color values F and retouch factors r allocated image point-wise are simultaneously read out. The retouch factors read out of the retouch memory 49 are forwarded over a data bus 57 to the correction value generator 40 in which they are multiplied according to the indicated equations by the color increments $\Delta F$ calculated in the color generator 38 in order to obtain the correction values $F_R$. The correction values $F_R$ are transmitted over data lines 58, 59, 60 and 61 to the digital adder stages 15, 16, 17 and 18 in the individual color channels.

A light spot 31 which is generated in the light spot generator 21 is faded into the picture screen 3 of the color monitor 2 in order to optionally make the image point marked by the coordinate pen 51 (center point of the brush surface) or the entire brush surface visible.

The movement of the coordinate pen 51 is synchronized with the movement of the light spot 31. To that end, the image point coordinates or, respectively, addresses determined in the evaluation circuit 48* are transmitted over an address bus 53' to the memory control unit 8 and are compared there to the cyclically called-in addresses of the image repetition memory 7. Given address equality, an instruction "light spot" arises on a line 34 and the light spot generator 21 generates the movable light spot 31 on the picture screen 3.

The invention is not restricted to the determination of the retouch factors from the plurality of image point contactings. On the contrary, it lies within the framework of the invention to also determine the retouch factors from the mechanical pressure with which the coordinate pen 51 is pressed against the digitization tablet 50 or, on the other hand, from the dwell time of the coordinate pen 51 on the corresponding points of the digitization tablet 50.

In the following, the determination of the retouch factors and the structure of the retouch generator 39* are to be described in greater detail.

Figure 7:
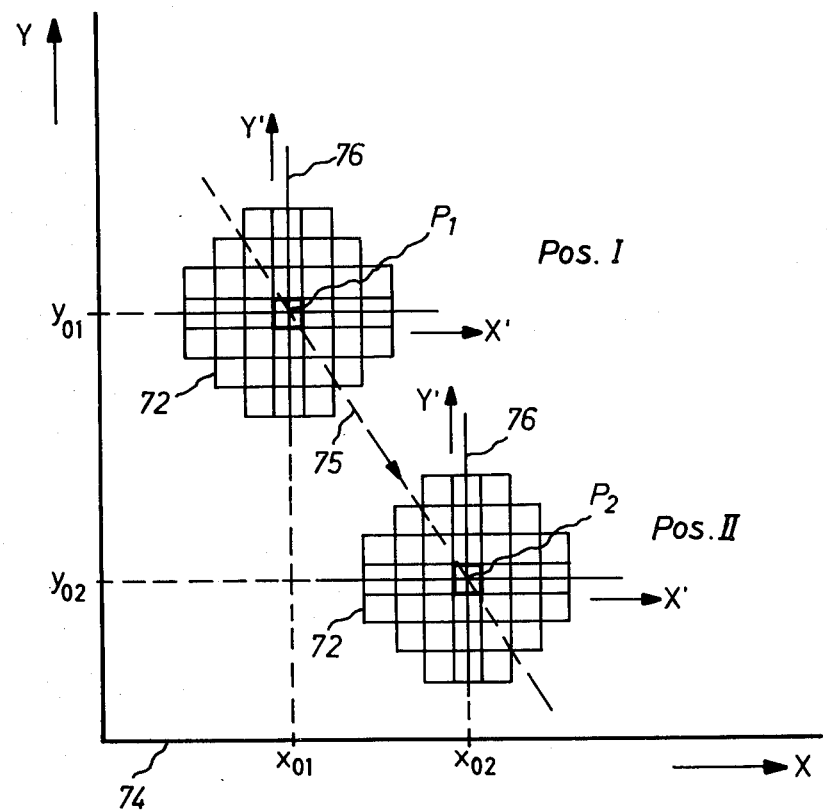
FIG. 7 a graphic illustration relating to the coordinate determination.

The calculation of the image point coordinates x and y within the brush surface is first explained on the basis of FIG. 7. What is illustrated is a section of the digitization tablet 50 of the coordinate identification device or, respectively, of the image to be retouched with two positions I and II of the brush surface 72 in the X/Y coordinate system 74. In position I, the brush surface 72 has the center point coordinates $x_{01}$ and $y_{01}$ and, in position II, it has the center point coordinates $x_{012}$ and $y_{02}$, whereby the points $P_1$ and $P_2$ are a matter of the points marked with the coordinate pen 51. The position II was reached by moving the coordinate pen 51 along a broken line 75.

A X'/Y' auxiliary coordinate system 76 which respectively proceeds through the center point P is allocated to the brush surface 72. The auxiliary coordinates x' and y' of those image points which participate in the formation of a brush surface in terms of shape and size are fixed in the X'/Y' auxiliary coordinate system 76. The corresponding image point coordinates x and y for the respective, individual momentary positions of the brush surface in the X/Y coordinate system 74 derive at:

$$x = x_0 + x'$$
$$y = y_0 + y' \qquad (4)$$

FIG. 8 shows a more detailed sample embodiment of the retouch generator 39*, particularly of the evaluation circuit 48*. The retouch generator 39* executes the functions: identification of the center point coordinates (a), calculation of the image point coordinates (b) and determination of the retouch factors (c).

(a) Identification of the Center Point Coordinates $(x_0; y_0)$

The center points P of the brush surface 72 (FIG. 7) are marked with the coordinate pen 51 on the digitization tablet 50 of the coordinate identification device, and the measuring stage 52 forwards the identified image point coordinates $x_0$ and $y_0$ to an adder stage 79 in the evaluation circuit 48* over the data bus 53, a comparison stage 77 and over a further data bus 78.

Such coordinate identification devices are commercially available (for example, Summagraphics, 35 Brentwood Ave., Fairfield, USA) and are known to one skilled in the art so that a detailed description is superfluous. Given the coordinate identification device of the sample embodiment, the coordinates are first determined with a significantly higher resolution than the resolution of the stored and displayed image consisting of 512×512 image points, whereby a high measuring precision is achieved. The measured coordinates are then converted in the measuring stage 52 to the possible 512×512 coordinates $x_0$ and $y_0$ or, respectively, addresses and are output.

(b) Calculation of the Image Point Coordinates (x;y)

Successive pairs of center point coordinates $x_0$ and $y_0$ are continuously compared to one another in the comparison stage 77. Given a coordinate change which occurs given a displacement of the coordinate pen 51, the comparison stage 77 supplies a command "coordinate change" to an address counter 81 on a line 80. The address counter 81, respectively started by the instruction "coordinate change", cyclically and line-wise polls all possible coordinates of the X'/Y' auxiliary coordinate system 76 which are supplied to a coordinate computer 83 over a data bus 82 for the determination of the auxiliary coordinates x' and y'. The coordinate computer 83 is programmed over a programming input 84 with the parameters of the desired brush surface according to FIGS. 3a through 3c. In the sample embodiment, let a circular brush surface be desirable, its size being prescribed by the radius R.

The coordinates called in by the address counter 81 are investigated in the coordinate computer 83 as to whether they meet the circle equation $x'^2 + y'^2 = R^2$ for the brush surface. The coordinates fulfilling the circle equation are the auxiliary coordinates x' and y' of the brush surface. The auxiliary coordinates x' and y' are forwarded over a data bus 85 to the adder stage 79 in which the image point coordinates x and y are formed according to equation (4).

Figure 9:
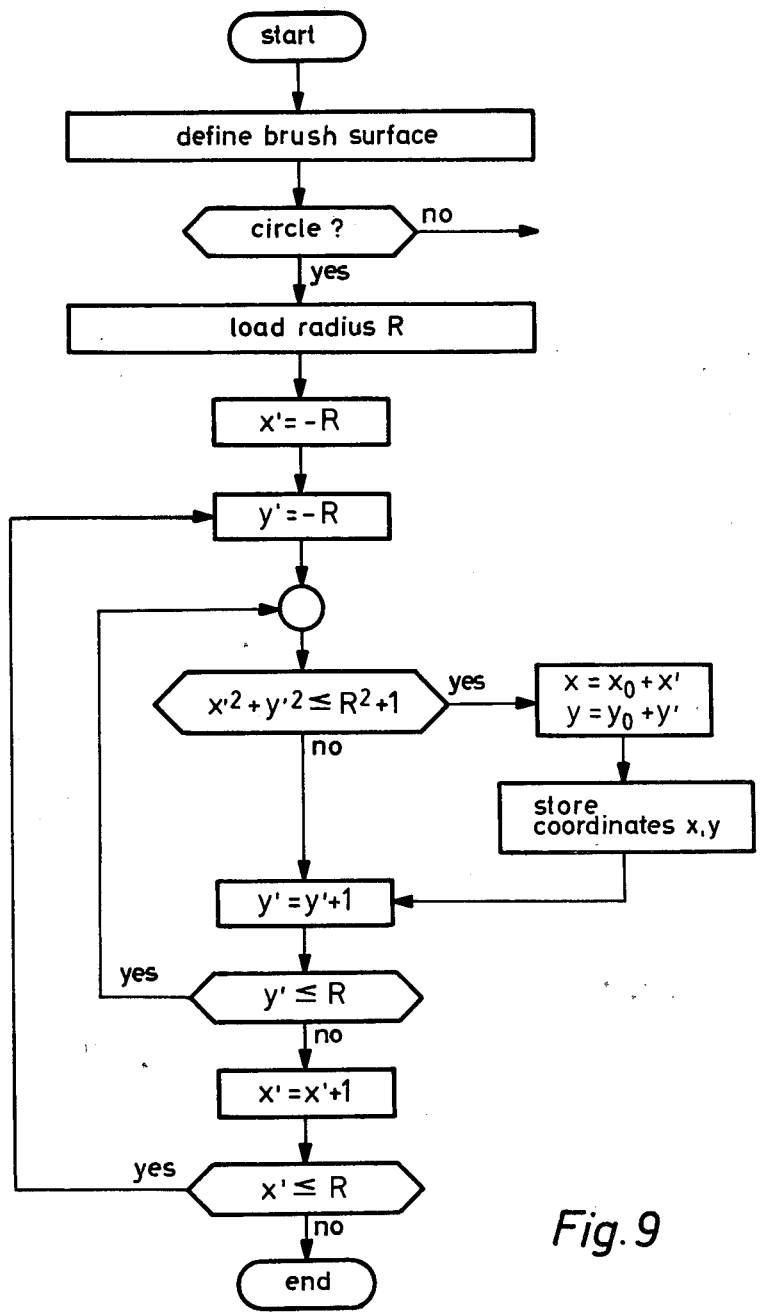
FIG. 9 a flow chart.

The computational sequence in the coordinate computer 83 for the example of a circular brush surface with the radius R is illustrated in a flow chart in FIG. 9.

In an alternative sample embodiment, the coordinate computer 83 can also contain a mask memory addressable by the called-in coordinates, into which mask memory the desired brush surface is programmed. The mask information controls a gate circuit for the called-in coordinates in such manner that only the coordinate values falling into the brush surface are allowed to pass as auxiliary coordinates x' and y'. This alternative embodiment is advantageously employed given randomly shaped brush surfaces.

(c) Determination of the Retouch Factors

First, the weighting factors w for the image points of the brush surface are determined. To that end, the auxiliary coordinates x' and y' address a weighting memory 87 over an address bus 86, the desired evaluation factors w of the brush surface having been previously input into said weighting memory 87 over a programming input 88 according to the weighting diagram of FIGS. 5 and 6. The weighting memory 87 has a capacity which at least corresponds to the plurality of image points arising on the largest brush surface.

The weighting factors w are overwritten from the weighting memory 87 into a process control computer 90 over a data bus 89. The image point coordinates x and y of the brush surface calculated in the adder stage 79 address a working memory 92 over an address bus 91 for the temporary storage of the retouch factors. The retouch factors deposited under the selected addresses of the working memory 92 are read into the process control computer over a data bus 93, are altered in accord with the correction steps and weighting factors, and are rewritten into the working memory 92. This operation is repeated at every instruction "coordinate change" which is reported to the process control computer 90 by the comparison stage 72 over a line 94, whereby all respective weighting factors of the brush surface are cyclically read out from the weighting memory 87 and the retouch factors allocated to the momentary positions of the brush surface are correspondingly altered in the working memory 92.

When, as previously described, the instruction "coordinate change" is given given a respective change of the center point coordinates, then the brush surfaces overlap given movement of the coordinate pen 51. If no overlap is to occur, the instruction "coordinate change" is delayed in the comparison stage 77 until the new center point coordinates of the assumed circular brush surface have at least the spacing R from the earlier ones.

In accord with the assumed 512×512 image points of the color image to be retouched, the working memory 92 as well as the retouch memory 49 have a capacity of 512×512×8 bit, so that a retouch factor up to the value 255 can be stored per image point (address).

In this manner, a diagram of the momentary, topical distribution of the desired degree of retouch in the color image arises in the working memory 92 in the form of the stored retouch factors r, whereby $r \neq 0$ in the image part to be retouched and $r = 0$ outside of this image part.

As already described, the retouch factors, signalled by the instruction "blanking interval" on the line 10, are transferred during the blanking interval of the image recording into the retouch memory 49, being transferred over the data bus 55 by means of the process control computer 90.

Commercial Utilization

The invention is advantageously employed in the entire field of electronic reproduction technology, particularly in the field of color image reproduction by means of electronic color scanners and image processing systems for the production of retouched and corrected printing forms in the form of color separations or printing cylinders.

We claim:

1. The method for partial electronic retouching of color images, in which color signals obtained by point-by-point and trichromatic scanning of color originals are digitaized and the digital color values of the individual color separations are stored in a storage medium, and in which the stored color values are corrected by color correction values, so as to obtain retouched color images, comprising the steps of:

(a) defining color increment values ($\Delta Y$, $\Delta M$, $\Delta C$, $\Delta K$) for said individual color separations, said color increment values representing the smallest amount of correction for said color values (Y, M, C, K) per retouching step, (b) generating simultaneously the locus-coordinates of a plurality of image points to be retouched by means of a corrdinate identification device with a marking means, such as a coordinate pen, said plurality of image points representing a correction area displaceable on the color image by said marking means, (c) during coordinate identification generating a retouch factor (r) for each image point within the correction area with said marking means, guiding said marking means similar to a retouch brush over that part of the color image to be retouched, said correction area representing the surface of said retouch brush, said retouch factors (r) representing the number of the desired retouching steps, (d) defining a freely selectable weighting factor (w) for each point of the correction area, said weighting factors (2) specifying the desired degree of retouching for said color values (Y, M, C, K) per retouching step as a multiple of the color increment values ($\Delta Y$, $\Delta M$, $\Delta C$, $\Delta K$), (e) generating correction values ($Y_R$, $M_R$, $C_R$, $K_R$) for each image point to be retouched in the color image by multiplying the color increment values ($\Delta Y$, $\Delta M$, $\Delta C$, $\Delta K$) with the corresponding retouch factors (r) and weighting factors (w); and (f) correcting said color values (Y, M, C, K) of the images points to be retouched by adding (positive retouching) or by subtracting (negative retouching) said corresponding correction values ($Y_R$, $M_R$, $C_R$, $K_R$) in order to obtain retouched color values (Y', M', C', K').

2. In a method according to claim 1 wherein the same weighting factors (w) are defined for all points of the correction area, whereby a uniform degree of retouch is achieved within the correction area of the marking means.

3. In a method according to claim 1, wherein decreasing weighting factors (w) are defined for the points of the correction area, said weighting factors (w) are proceeding from the center of the correction area towards its edge, whereby a gradual degree of retouch is achieved within the correction area of the marking means.

4. In a method according to claim 3, wherein the weighting factors (w) are defined according to a selectable function, particularly according to a Gauss function.

5. In a method according to claim 1, further comprising the steps of:
(a) identifying the locus-coordinates of at least one image point within the correction area by marking the image point with said marking means of said coordinate identification deivce, and
(b) calculating the locus-coordinates of the surrounding image points forming the correction area from the locus-coordinates of said marked image point.

6. In a method according to claim 5, wherein size and shape of said correction area are determined by selecting the surrounding image points the locus-coordinates of which are to be calculated from the locus-coordinates of said marked image point.

7. In a method according to claim 1, wherein the retouch factor (r) of an image point is generated by the number of contacts of said marking means with said image point in said coordinate identification device, whereby the retouch factor (r) increases (intensification for positive retouching) or decreases (intensification for negative retouching).

8. In a method according to claim 1, further comprising the steps of:
(a) displaying the unretouched or retouched color image or, respectively, an unretouched or retouched color separation on a color monitor for visual control;
(b) generating a moveable light mark on the screen of said color monitor; and
(c) synchronizing the motion of said light mark with the motion of the marking means of said coordinate identification device, said light mark visibly indicating in said color image or said color separation the image points of the correction area of said marking means.

9. In a method according to claims 1 and 8, further comprising the steps of:
(a) transferring the color values (Y, M, C, K) of the color image from said storage medium into an image refresh memory;
(b) writing the generated retouch factors (r) of the image points to be retouched into a retouch memory;
(c) reading out synchronously the retouch factors (r) from said retouch memory and the color values (Y, M, C, K) from said image refresh memory;
(d) generating said correction values ($Y_R$, $M_R$, $C_R$, $K_R$);
(e) correcting said read out color values (Y, M, C, K) by said generated correction values ($Y_R$, $M_R$, $C_R$, $K_R$) to obtain said retouched color values (Y', M', C', K'); and
(f) converting said color values (Y, M, C, K) of said color original or said retouched color values (Y', M', C', K') of said retouched color image into control signals for said color monitor.

10. In a method according to claim 9, wherein the generated retouch factors (r) are respectively written into the retouch memory during the blanking interval of said color monitor.

11. In a method according to claim 1, further comprising the steps of:
(a) storing the plurality of pairs of locus-coordinates in the sequence of their identification by said marking means of said coordinate identification devices;
(b) calling up selected locus-coordinates from said plurality in reversed sequence; and
(c) reducing the retouch factors (r) corresponding to said selected locus-coordinates, whereby the retouch strength achieved during the preceding retouching process within an area of said color image defined by said selected locus-coordinates is reduced true to the contours of said area.

12. The method according to claim 1, wherein the overall retouch process can be reversed by erasing said generated retouch factors (r) in said retouch memory.

13. In a method according to claim 1, wherein the part of the color image to be retouched is limited by means of an electronically generated mask.

14. Apparatus for partial electronic retouching color images in which color signals obtained by point-by-point and trichromatic scanning of color originals are digitized and the digital color values of the individual color separations are stored in a storage medium, comprising:
(a) an image refresh memory (7) for the digital color values (Y, M, C, K);
(b) a color monitor (2) for displaying said color image or said retouched color image;
(c) a color generator (38) for the formation of color increment values ($\Delta Y$, $\Delta M$, $\Delta C$, $\Delta K$);
(d) a coordinate identification device (50; 52) having marking means (51), particularly a cursor for identifying the locus-coordinates of at least an image point to be retouched;

(e) a comparison stage (77) connected to the coordinate identification device (50; 52) for comparison of the identified locus-coordinates;

(f) a coordinate-calculator (81; 83) for calculating the coordinates of the points within the correction area of said marking means (51);

(g) an adder-stage (79) connected to the comparison stage (77) and the coordinate-calculator (81; 83) for generating the locus-coordinates of the actual image points to be retouched within the correction area from said identified locus-coordinates and said calculated coordinates of the points within the correction area;

(h) a weighing memory (87) for storing weighting factors (w) for the points of the correction area connected to said coordinate-calculator (81; 83) and addressable by said calculated coordinates of the points within the correction area;

(i) process control means (90; 92) connected to the weighting memory (87) and said adder-stage (79) for generating retouch factors (r) from said identified locus-coordinates and for generating weighted retouch factors (r') from said retouch factor (r) and said weighting factors (w);

(j) a retouch memory (49) connected to said process control means (90; 92) for storing said weighted retouch factors (r');

(k) a correction value generator (40) connected to the color generator (38) and said retouch memory (49) for formation of correction values ($Y_R$, $M_R$, $C_R$, $K_R$) from said color increment values ($\Delta Y$, $\Delta M$, $\Delta C$, $\Delta K$) and said weighted retouch factors (r'); and (l) combining stages (15; 16; 17) arranged in the color channels and connected to said image refresh memory (7), to the color monitor (2) and to said correction value generator (40) for the correction of the color values (Y, M, C, K) stored in said image refresh memory (7) by means of said correction values ($Y_R$, $M_R$, $C_R$, $K_R$,) so as to obtain retouched color values (Y', M', C', K').

* * * * *